(12) United States Patent
Lin et al.

(10) Patent No.: US 6,884,507 B2
(45) Date of Patent: Apr. 26, 2005

(54) USE OF HIGH MODULUS, IMPACT RESISTANT FOAMS FOR STRUCTURAL COMPONENTS

(75) Inventors: Wendy Wen-Ling Lin, Niskayuna, NY (US); Scott Roger Finn, Niskayuna, NY (US); Kevin Warner Flanagan, Albany, NY (US); Joseph Timothy Stevenson, Amelia, OH (US); James Claude Carnahan, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 167 days.

(21) Appl. No.: 10/366,257

(22) Filed: Feb. 13, 2003

(65) Prior Publication Data

US 2004/0198852 A1 Oct. 7, 2004

Related U.S. Application Data

(63) Continuation-in-part of application No. 09/682,684, filed on Oct. 5, 2001, now abandoned.

(51) Int. Cl.$^7$ .............................................. B32B 15/02
(52) U.S. Cl. ................... 428/402.21; 521/54; 521/137; 521/159
(58) Field of Search ....................... 428/402.21; 521/54, 521/137, 159

(56) References Cited

U.S. PATENT DOCUMENTS

| | | |
|---|---|---|
| 4,397,799 A | 8/1983 | Edgren et al. |
| 5,338,478 A | 8/1994 | Barry et al. |
| 5,484,815 A | 1/1996 | Petersen et al. |
| 5,490,764 A | 2/1996 | Schilling |
| 5,538,786 A | 7/1996 | Hurley et al. |
| 5,634,771 A | 6/1997 | Howard et al. |
| 5,720,597 A | 2/1998 | Wang et al. |
| 5,773,121 A | 6/1998 | Meteer et al. |
| 5,791,879 A | 8/1998 | Fitzgerald et al. |
| 5,990,258 A | 11/1999 | Peter |
| 5,994,418 A | 11/1999 | Weiser et al. |
| 6,020,387 A | 2/2000 | Downey et al. |
| 6,039,542 A | 3/2000 | Schilling et al. |
| 6,099,257 A | 8/2000 | Schilling |
| 6,103,152 A | 8/2000 | Gehlsen et al. |
| 6,287,080 B1 | 9/2001 | Evans et al. |
| 6,362,107 B1 | 3/2002 | Shiro et al. |

OTHER PUBLICATIONS

Casting High Performance Elastomeric Products with MCDEA Chain Extender; Rosenberg et al., Utech Asia '99, Elastomer Paper, pp. 1–8.
Polyurethane Cast Elastomers with Lonzacure MCDEA Curative; Air Products and Chemicals, Inc., 1996.
Lonzacure MCDEA–Cured Elastomer Systems; Air Products nd Chemicals, Inc., 1996.

*Primary Examiner*—Morton Foelak
(74) *Attorney, Agent, or Firm*—Andrew J. Caruso; Patrick K. Patnode

(57) ABSTRACT

The present invention provides tough, high modulus, low density thermoset polyurethane compositions which are useful in general as, for example, cast structural materials and in a preferred embodiment can be cured directly onto an aircraft engine fan blade, thereby providing a lighter blade, without concomitant loss in structural integrity or blade performance due to, for example, resistance to foreign object impacts and fuel efficiency. In a preferred embodiment, the composition is comprised of bis-amine compounds reacted with isocyanate-functional polyether polymers in the presence of hollow polymeric microspheres. The thermoset polymer compositions are formed by casting into a mold which is formed by a cavity within the metallic or composite fan blade or guide vane in the form of a pocket and a removable caul sheet. After the elastomeric polyurethane foam is injected through at least one injector port into the mold, the foam is cured.

9 Claims, 3 Drawing Sheets

US 6,884,507 B2

USE OF HIGH MODULUS, IMPACT RESISTANT FOAMS FOR STRUCTURAL COMPONENTS

RELATED APPLICATION

This application is a continuation-in-part of U.S. application Ser. No. 09/682,684, filed Oct. 5, 2001 now abandoned.

BACKGROUND OF THE INVENTION

The present invention relates generally to thermoset polymeric compositions useful in structural applications, and more particularly to turbine blades comprised of two or more components made from different materials, one of which is the thermoset polymeric compositions of the invention.

Turbines include, but are not limited to, gas and steam turbine power generation equipment and gas turbine aircraft engines. A gas turbine includes a core engine having a high pressure compressor to compress the air flow entering the core engine, a combustor in which a mixture of fuel and compressed air is burned to generate a propulsive gas flow, and a high pressure turbine which is rotated by the propulsive gas flow and which is connected by a larger diameter shaft to drive the high pressure compressor. A typical front fan gas turbine engine adds a low-pressure turbine (located aft of the high pressure turbine) which is connected by a smaller diameter coaxial shaft to drive the front fan (located forward of the high pressure compressor). The low-pressure compressor is sometimes called a booster compressor or simply a booster.

The fan and the high and low pressure compressor and turbine engines have turbine blades each including an airfoil portion attached to a shank or dovetail portion. Rotor blades are those turbine blades each including an airfoil portion attached to a shank or dovetail portion. Stator vanes are those turbine blades which are attached to a non-rotating turbine stator casing. Typically, there are alternating circumferential rows of radially-outwardly extending rotor blades and radially-inwardly extending stator vanes. When present, a first and/or last row of stator vanes (also called inlet and outlet guide vanes) may have their radially inward ends also attached to a non-rotating gas turbine stator casing. Counter rotating "stator" vanes are also known. Conventional gas turbine blade designs typically have airfoil portions that are made entirely of metal, such as titanium, or are made entirely of continuous fiber reinforced composites (CFRC). The all-metal blades are heavier in weight which results in lower fuel performance and requires sturdier blade attachments, while the lighter all-composite blades are more susceptible to damage from bird ingestion events. Known hybrid blades include a composite blade having an airfoil shape which is covered by a surface cladding (with only the blade tip and the leading and trailing edge portions of the surface cladding comprising a metal) for erosion and foreign object impacts. The fan blades typically are the largest (and therefore the heaviest) blades in a gas turbine aircraft engine, and the front fan blades are usually the first to be impacted by foreign objects such as birds. What is needed is a lighter-weight gas turbine blade, and especially an aircraft-engine gas turbine fan blade, which is both lighter in weight and better resistant to damage from ingestion of foreign objects and blade out events.

SUMMARY OF THE INVENTION

The present invention provides tough, high modulus, low-density thermoset polyurethane compositions which are useful in general as, for example, cast structural materials. In a preferred embodiment, the compositions can be cured directly onto an aircraft engine fan blade, thereby providing a lighter blade, without concomitant loss in structural integrity or blade performance due to, for example, resistance to foreign object impacts and fuel efficiency. The composition is comprised of polyurethanes having dispersed therein certain hollow microspheres. The term "polyurethane" is used generically herein to denote polymers prepared by the reaction of at least one polyisocyanate compound and at least one polyfunctional active hydrogen-containing compound, with the understanding that the polymer may contain, for example, urea linkages in addition to or instead of polyurethane linkages. The presence of the microspheres allows careful control over the resulting void space during the formation of the polyurethane polymer matrix. This lack of any in situ cell nucleation or expansion process can be contrasted with traditional foamed polyurethanes, wherein the voids are produced by the reaction chemistry, i.e., gas production, by blowing agent additives, or by the introduction of soluble gases that release during the process. Control of the void spaces in such systems is thus difficult and there exists a variety of additives which modify and improve the void spaces' size and distribution. These include nucleation agents, materials designed to modify surface tension and agents that modify resin viscosity.

In a preferred embodiment of the invention, a bis-amine compound is first blended with UV and oxidative stabilizers to form a curative system. A prepolymer system is formed by blending pre-expanded polymeric microspheres with molten isocyanate-functional polyether prepolymer. The curative system is then mixed with the prepolymer system and cast into a preheated mold to form an elastomeric polyurethane foam. The foam and mold are placed into a holding oven at a predetermined temperature for a predetermined period of time, and thereafter, the foam is demolded and placed into a curing oven at a predetermined temperature for a predetermined period of time sufficient to cure the elastomeric polyurethane foam thus provided.

As noted above, the thermoset polymer compositions of the present invention are useful in the manufacture of turbine fan blades, as a partial replacement for the metallic or composite structure of such blades. In this regard, such blades are typically made entirely of metals such as titanium alloys, or alternatively, are made entirely of composite materials. A "composite" material denotes a material having any (metal or non-metal) fiber filament embedded in any (metal or non-metal) matrix binder, but the term "composite" does not include a metal fiber embedded in a metal matrix The term "metal" includes alloys such as titanium alloy 6A14V. An example of a composite material is a material having graphite filaments embedded in an epoxy resin.

The thermoset polymer compositions are formed by casting into a mold which is formed by a cavity within the metallic or composite fan blade in the form of a pocket and a removable caul sheet. Each fan blade may have a plurality of pockets. The caul sheet is a composite that is affixed to the fan blade so that each of the pockets is temporarily enclosed. The caul sheet includes at least one injection port to provide a flow path for the uncured foam into the pockets, which have assumed the shape of a mold with the attachment of the composite caul sheet. After the elastomeric polyurethane foam is injected through at least one injector port into the mold, the foam is cured.

DETAILED DESCRIPTION OF THE INVENTION

Figure 1:
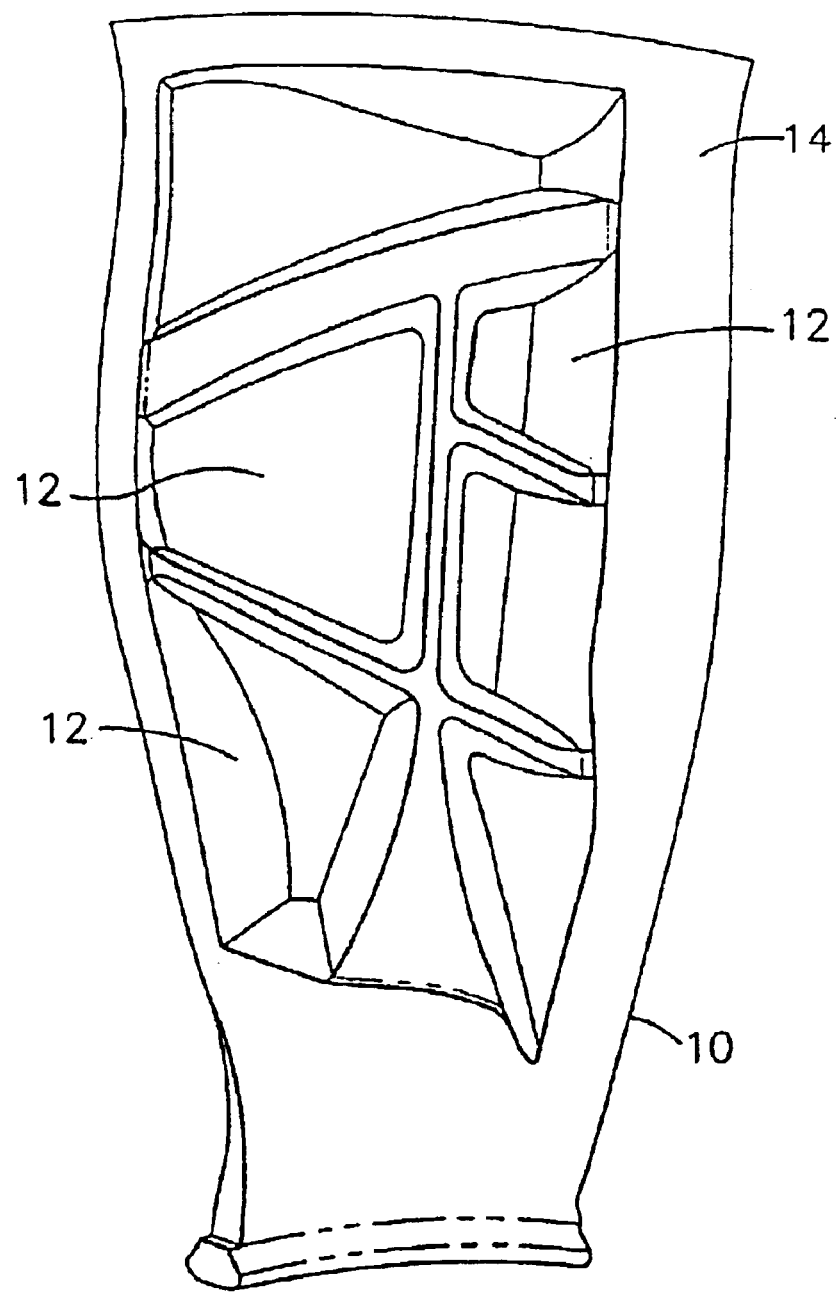
FIG. 1 is a perspective of an aircraft engine fan blade, showing pockets formed therein.

In a first aspect, the present invention provides a thermoset polymer composition having a modulus of elasticity of at least about 250 pounds per square inch (psi) (1.72 megapascal (MPa)), comprising (a) a polyurethane having dispersed therein (b) hollow polymeric microspheres having an average diameter of <1000 μm, said microspheres comprised of a shell portion and a hollow core portion, said shell portion comprised of at least one polymer resin.

In this regard, while we refer to such compositions as "foams", such compositions actually exist as closed cell, syntactic cellular polymer compositions, which in a preferred embodiment, have a density of about 0.1 grams per cubic centimeter to 0.9 grams per cubic centimeter.

The polyurethane, as described previously, is a polymer prepared by the reaction of at least one polyisocyanate compound and at least one polyfunctional active hydrogen-containing compound. In a preferred embodiment, the polyurethane is prepared by contacting at least one polyether polymer having a number average molecular weight of about 250 Daltons to about 60,000 Daltons, and an isocyanate functionality of about 3.0% to about 7.0%, with at least one curative compound which is a polyfunctional active hydrogen-containing compound. Alternatively, a hydroxy-functional polymer, at least one isocyanate compound, and the active hydrogen-containing curative can be reacted at once and the hollow polymeric microspheres added and dispersed evenly therein before such time as the curing composition becomes too viscous or gels.

In a second aspect, the present invention provides a thermoset polymer composition having a modulus of elasticity of at least about 250 psi (1.72 MPa), comprising the reaction product of (a) a curative system comprising at least one compound having at least two active hydrogen groups per molecule; and (b) a prepolymer composition comprising the product of the melt blending of (i) hollow polymeric microspheres having an average diameter of from about <1000 μm, said microspheres comprised of a shell portion and a hollow core portion, said shell portion comprised of at least one polymer resin; and (ii) at least one polyether having a molecular weight of about 250 Daltons to 60,000 Daltons and an isocyanate functionality content of about 3.0% to 7.0%.

In this aspect of the invention, preferred thermoset polymer compositions will possess a modulus of elasticity of at least about 250 psi (1.72 MPa), preferably about 250 to 250,000 psi (1.72 to 1720 MPa), more preferably between about 1000 and 50,000 psi (6.89 to 345 MPa)over the operating temperature range. An elastomeric composition that is too soft, i.e., having a modulus of elasticity of generally less than 250 psi (1.72 MPa) may not be able to structurally maintain an airfoil shape for dynamic fan blades and an elastomer that is too hard, i.e., greater than about 100,000 psi (689 MPa) may not be able to resiliently recover from a heavy bird impact. A more preferred range for the modulus of elasticity for the elastomeric composition is between about 1000 and 30,000 psi (6.89 to 207 MPa). In a further preferred embodiment, the elastomeric composition is resilient over typically occurring flight temperature ranges. In this regard, a typical flight temperature range is between about −65 and 400° F. (−54 to 204° C.).

The curative system of the present invention comprises at least one compound possessing at least two active hydrogen groups. Examples of such compounds include polyamines, polyhydroxy compounds, and compounds having both hydroxyl and amino functionality. Examples of such curative compounds include those having the general structural formulas:

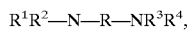

$R^1R^2$—N—R—$NR^3R^4$, wherein R is an aromatic group or aliphatic group, $R^1$ is hydrogen, $R^2$ is hydrogen, alkyl, or phenyl; $R^3$ is hydrogen, alkyl, or phenyl, and $R^4$ is hydrogen, alkyl, or phenyl;

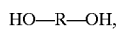

HO—R—OH, wherein R is as defined above; and

$R^1R^2$—N—R—OH, wherein R is as defined above; $R^1$ is hydrogen; and $R^2$ is hydrogen, alkyl, or phenyl.

Further examples of curative agents include amines such as methylene-bis-o-chloroaniline; 4,4'-methylenebis(3-chloro-2,6-diethylaniline); isophoronediamine, diethylene diamine, 1,2bis(2-amino-phenylthioethane); diethyltoluene diamine; dimethylthiotoluenediamine; 1,3-trimethylene glycol bis(p-aminobenzoate); and methylene bis N,N dibutyla-niline; dihydroxy compounds such as 1,3-butanediol; 1,4-butanediol; 2,2-dimethyl- 1,3-propanediol; poly (tetramethylene ether glycol), having molecular weights of about 178 to 50,000 Daltons, 1,1'isopropylidine-bis-(p-phenylene-oxy)-di-2 ethanol; 1,4cyclohexanedimethanol; glycerine; 1,6-hexanediol; hydroquinone di(β-hydroxyethyl ether); 2-methyl-1,3-propanediol; N,N,N',N'-tetrakis(2-hydroxyethyl)ethyl diamine; d-glucitol; and trimetiylolpropane. An especially preferred curative agent is 4,4'-methylenebis(3-chloro-2,6-diethylaniline), available through Air Products, Inc., through an arrangement with Lonza, Inc., under the trademark LONZACURE® MCDEA.

Any suitable organic isocyanate which is capable of reacting with a polyol or polyamine can be utilized. The molecular weight equivalent ratio of isocyanate component to polyol or polyamine component is preferably from about 0.8 to about 1.2, more preferably about 0.90 to about 1.05. Examples of polyisocyanate compounds include 2,4-toluene diisocyanate; 2,6-toluene diisocyanate; 4,4'-diphenylmethane diisocyanate; 1,5-naphthalene diisocyanate; 4,4"-dicyclohexylmethiane diisocyanate; p-phenylene diisocyanate; isophorone diisocyanate; polymeric methylene diphenyl diisocyanate; 1,6-hexamethylene diisocyanate; 1,4-cyclohexane diisocyanate; bis(isocyanatomethyl) cyclohexane; and tetramethylxylylene diisocyanate.

These polyisocyanate compounds can be reacted with polymers comprising terminal active-hydrogen-containing functional groups to form prepolymers having isocyanate functionality. Such active hydrogen-containing polymers include hydroxyl-terminated polyether (aliphatic or aromatic); amine terminated polyethers (aliphatic or aromatic); hydroxyl terminated polyesters; amine or hydroxy terminated polyimides; and hydroxyl-functional polycarbonates. Preferred prepolymers as contemplated by the present invention include certain polyether polymers having isocyanate functionality. In a preferred embodiment, the polyether is a polyalkylene polymer having a number average molecular weight of about 178 Daltons to about 60,000 Daltons. Especially preferred polyethers include those derived from polytetramethylene ether glycols (PTMEG). The preferred polyalkylene ether polyols may be represented by the formula HO(RO)$_n$H, where R is an alkylene residue (C$_1$–C$_{10}$), and n is an integer large enough that the polyether polyol has a number average molecular weight of at least 178. These polyalkylene ether polyols are well known and can be prepared by the polymerization of cyclic ethers (such as alkylene oxides) and glycols, dihydroxyethers, and the like by known methods.

Depending on the viscosity of the polyurethane/microsphere blend as the polyurethane undergoes complete cure, it may be desirable to utilize certain thixotropic agents, such as clays and/or hydrogenated castor oils, in order to prevent the microspheres from settling out of the composition or otherwise cure within the matrix in less than a homogeneous distribution. See for example, U.S. Pat. No. 6,020,387, incorporated herein by reference.

Various additives can also be employed in preparing the foam which serve to provide different properties. The foam may also include a number of other additives. Examples of suitable additives include tackifiers (e.g., rosin esters, terpenes, phenols, and aliphatic, aromatic, or mixtures of aliphatic and aromatic synthetic hydrocarbon resins), plasticizers, pigments and fillers, e.g., carbon black, clay, calcium sulfate, barium sulfate, ammonium phosphate, dyes, non-expandable polymeric or glass microspheres, reinforcing agents, hydrophobic or hydrophilic silica, calcium carbonate, toughening agents, fire retardants, antioxidants, finely ground polymeric particles such as polyester, nylon, or polypropylene, stabilizers, and combinations thereof. These additives are added in amounts sufficient to obtain the desired end properties.

The stoichiometric ratio of curative to prepolymer is approximately 90–105%. The microsphere is preferably added from 2.0% to 6.0% by weight of the prepolymer and most preferably about 3.0% to 5.0% by weight. When included, anti-oxidant is added up to 1% by weight of the overall prepolymer plus curative composition weight, and preferably 0.23%–0.27% by weight of the prepolymer plus curative composition, and most preferably about 0.25% by weight.

The hollow polymeric microspheres feature a flexible, thermoplastic, polymeric shell and a core that includes a liquid and/or gas which expands upon heating. Preferably, the core material is an organic substance that has a lower boiling point than the softening temperature of the polymeric shell. Examples of suitable core materials include propane, butane, pentane, isobutane, neopentane, and combinations thereof. The microspheres utilized herein have been pre-expanded to an average diameter of about less than 1000 μm. Moreover, only a residual amount if any of the hydrocarbon gas/liquid core thus remains; accordingly, we refer to such microspheres herein as being "hollow". The use of pre-expanded microspheres has significant advantages over traditional cell formation and expansion techniques. For example, in traditional foaming processes and in situ microsphere expansion techniques, stringent controls on processing times, processing temperatures, mold design, and the volume of material delivered to the mold are necessary in order to produce materials with the desired cell structure. By eliminating the need for such controls, the process is simplified. Furthermore, temperature gradients throughout a material during traditional foam manufacture, or in situ microsphere expansion processes can result in density gradients in the cured part, which correspond with undesirable variation in mechanical properties. Use of pre-expanded microspheres ensures uniform density and mechanical properties in the cured part.

In the polymeric microspheres, the choice of thermoplastic resin for the polymeric shell influences the mechanical properties of the resulting foam as well as affecting the processing flexibility. For example, microspheres having a relatively high proportion of acrylonitrile in the polymer shell exhibit better tolerance for high temperature than, for example, microspheres with a high proportion of vinylidene chloride . Accordingly, the properties of the foam may be adjusted through appropriate choice of microsphere, or by using mixtures of different types of microspheres. For example, acrylonitrile-containing resins are useful where high tensile and cohesive strength are desired, particularly where the acrylonitrile content is at least 50% by weight of the resin, more preferably at least 60% by weight, and even more preferably at least 70% by weight. In general, both tensile and cohesive strength increase with increasing acrylonitrile content. This provides the capability of preparing high strength, low density articles.

Examples of suitable thermoplastic resins which may be used as the shell include polymers prepared from acrylic and methacrylic acid esters and copolymers thereof. Vinylidene chloride-containing polymers such as vinylidene chloride-methacrylate copolymer, vinylidene chloride-acrylonitrile copolymer, acrylonitrile-vinylidene chloride-methacrylonitrile-methyl acrylate copolymer, and acrylonitrile-vinylidene chloride-methacrylonitrile-methyl methacrylate copolymer may also be used, but are not preferred where high strength is desired. In general, where high strength is desired, the microsphere shell preferably has no more than 20% by weight vinylidene chloride, more preferably no more than 15% by weight vinylidene chloride. Even more preferred for high strength applications are microspheres have essentially no vinylidene chloride units. Microspheres made of a variety of other thermoplastic polymers can also be used, including, for example, ULTEM® polyetherimide, made by the General Electric Company.

Examples of suitable commercially available polymeric microspheres include those available from Pierce Stevens (Buffalo, N.Y.) under the designations "F30D," "F80SD," and "F100D." Also suitable are polymeric microspheres available from Akzo-Nobel under the designations EXPANCEL® 551 DE, EXPANCEL® 461 DE, and EXPANCEL® 091 DE. Each of these microspheres features an acrylonitrile-containing shell. In addition, the F80SD, F100D, and EXPANCEL® 091 and 091DE microspheres have essentially no vinylidene chloride units in the shell. In the case of the EXPANCEL® microspheres, the product designation "DE" refers to dry, expanded microspheres.

The amount of microspheres incorporated is selected based upon the desired properties of the foam product. In general, higher microsphere concentrations give lower density foams, but also reduce modulus and strength. In general, the amount of microspheres ranges from about 0.1 parts by weight to about 50 parts by weight (based upon 100 parts of polymer resin), more preferably from about 0.5 parts by weight to about 6 parts by weight.

A preferred hollow microsphere is a polymeric microsphere less than 1000 microns in diameter with the most preferred being a microsphere less than 200 microns in diameter and less than 0.1 grams per cubic centimeter in true density. One such hollow microsphere is EXPANCEL® 091 DE, available from EXPANCEL of Sundsvall, Sweden.

In a preferred embodiment of the present invention, a hindered amine light stabilizer (HALS), such as TINUVIN® 765, and/or an ultraviolet light (UV) absorber, such as TINUVIN®D 571 are added to the first mixture of anti-oxidant/curative mixture prior to melting. These additives assist in preventing deterioration of the blade as a result of exposure to radiation from the sun, thereby extending the life of the polyurethane composition and thus the blade as a whole. When included, the HALS is added up to about 2% of the overall prepolymer plus curative composition weight, preferably about 0.46–0.50% of the composition weight and most preferably about 0.48% by weight. When included, the UV absorber is added up to about 2% of the overall composition by weight, preferably about 0.22–0.26% of the overall prepolymer plus curative composition weight and most preferably about 0.24% by weight The preferred HALS, TINUVIN® 765, and the preferred UV absorber, TINUVIN® 571, are available from CIBA Specialty Chemicals Corporation of Switzerland. The processing is otherwise identical to that specified above for the first embodiment In a preferred embodiment, as noted above, a hindered amine light stabilizer and/or a UV absorber may be added to the curative system together with the an anti-oxidant. Other examples of HALS include the following: conventional hindered phenols, as well as vitamin E or compounds having a similar structure, benzophenones, resorcinols, salicylates, benzotriazoles and the like, for example Irganox®, Tinuvin®, such as Tinuvin® 770 (HALS absorber, bis(2,2,6,6-tetramethyl-4piperidyl) sebacate) or Tinuvin® P (UV absorber-(2H-benzotriazol-2-yl)-4methylphenol), Topanol®). These additives are preferably used in amounts of up to 2% by weight based on the total mixture. In a preferred embodiment the composition comprises an N-phenylbenzenamine antioxidant, such as CIBA® IRGANOX® 5057. In a further preferred embodiment, the final article prepared from the thermoset composition is coated with a coating composition comprised of at least one UV-absorbing compound.

In a preferred embodiment of the present invention, and as an illustration of the manufacture of the articles of the present invention, the following procedure may be utilized. First, a desired amount of a diamine curative such as LONZACURE® MCDEA in the appropriate amount is weighed, to which is added a pre-selected amount of anti-oxidant such as N-phenylbenzenamine. About 0.24% by weight, based on the overall prepolymer plus curative composition of IRGANOX® 5057, is added. The UV absorber, preferably TINUVIN® 765, and the HALS, preferably TINUVIN® 571, are added in suitable amounts to provide the desired environmental protection. In the preferred embodiment, these are added in the amount of about 0.24% and 0.48%, respectively. The percentages are provided based on the total weight of the polyurethane composition. This first mixture is heated to a maximum temperature about 250° F. ( 121° C.) for a time sufficient to melt the mixture. The melted mixture is then stirred to ensure uniformity. This first mixture is then poured through a strainer into an uncontaminated tank, which is protected with an atmosphere of nitrogen sufficient to prevent atmospheric contamination, typically about 30–40 psi (0.207 to 0.276 MPa) of nitrogen.

A urethane pre-polymer, such as toluene di-isocyanate (TDI) capped polyether with an isocyanate (NCO) functionality content of about 3.5% to 7.0% is preferred, such as ADIPRENE® LF 950A, which is available from Uniroyal Chemical Company of Middlebury, Conn. In this regard, it may be necessary to melt the prepolymer, particularly if it has solidified. This may be accomplished by placing a drum of the material in an oven capable of holding it at a temperature in the range of about 100–140° F. (38–60° C.) until fully melted. The prepolymer is then stirred and dispensed into a secondary container to a predetermined weight. The hollow microspheres, such as EXPANCEL® 091 DE are blended into the melted prepolymer to a predetermined percentage. This second mixture is then mixed and degassed using suitable equipment. Care is taken to prevent the prepolymer from contacting moisture, as moisture will adversely affect the material. This first mixture is added to the second mixture and thoroughly mixed to form a homogeneous third mixture. The third mixture is cast into a pre-heated mold.

The prepolymer mixture tanks, pumps, and lines are generally heated to temperatures in the range of about 125–212° F. (52–100° C.), and the tank, pump, and lines for the curative mixture are heated to temperatures in the range of about 215–235° F. (100–113° C.). After pumps are calibrated to ensure that prepolymer mixture and the curative mixture will be dispensed to achieve a preferred stoichiometric ratio of 90%–105% curative to prepolymer, the lines are attached to their respective tanks or containers and the materials are transferred from the tanks or containers to a mixer to ensure a uniform third mixture. The third mixture is then transferred to an injection pump or injection manifold, after which it is injected into the desired mold.

Referring now to the drawings, FIG. 1 schematically shows an aircraft engine fan blade 10 used in a preferred embodiment of the present invention. The fan blade 10 is made from a structural material, typically a metal such as titanium or aluminum alloy or a CFRC and has a convex side and a concave side. Six pockets 12 typically are manufactured into the concave (pressure) side 14, as shown in FIG. 1. The number of pockets is dependent upon the configuration and size of the blade, and fewer or more pockets may be included as desired. The pockets may be formed in the blade by any conventional means such as by machining. Conveniently, the blade may be cast with the pockets being an integral part of the cast configuration.

Figure 2:
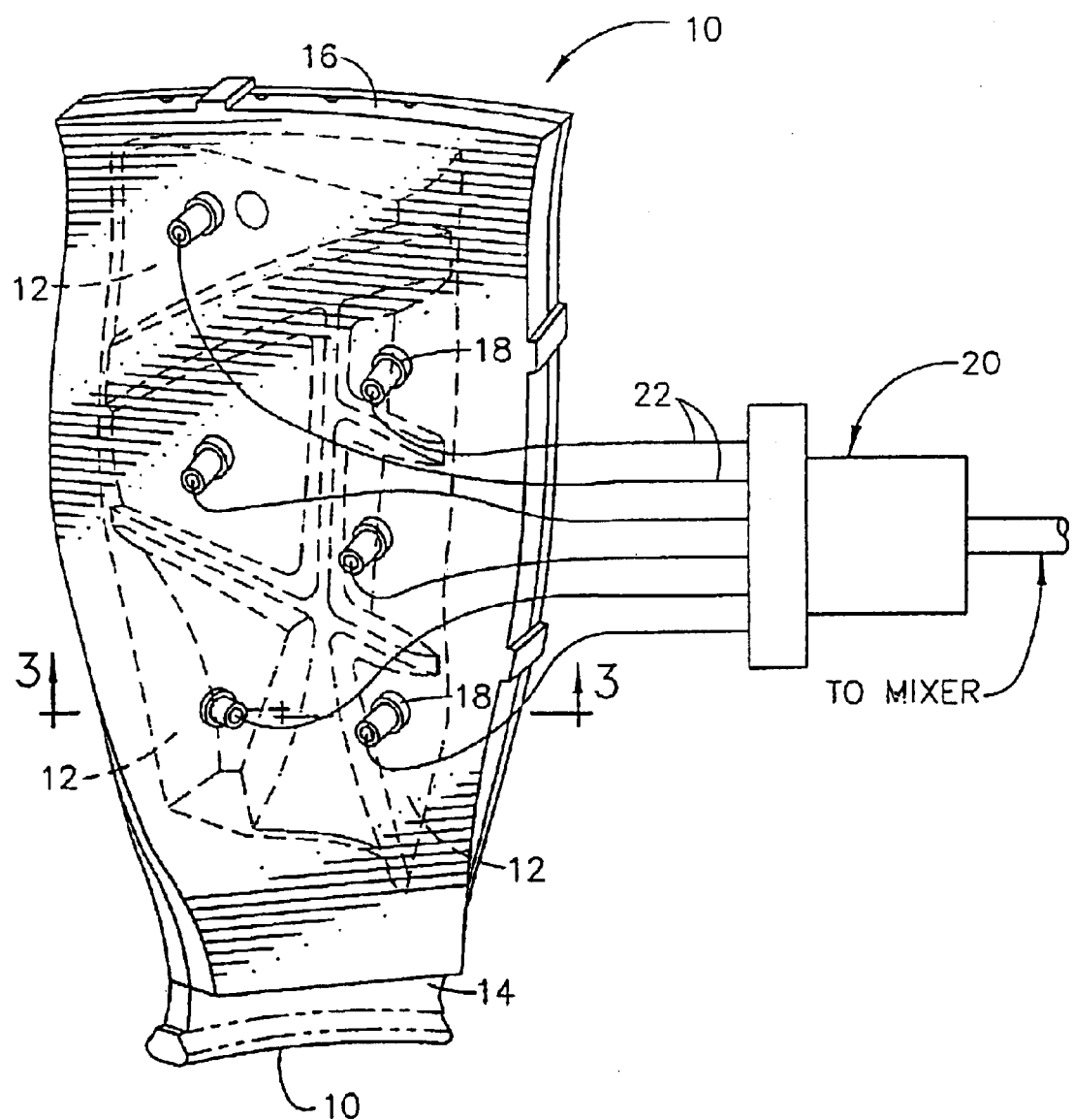
FIG. 2 is a perspective of the injection system described herein, whereby the hybrid fan blade is formed.
Figure 3:
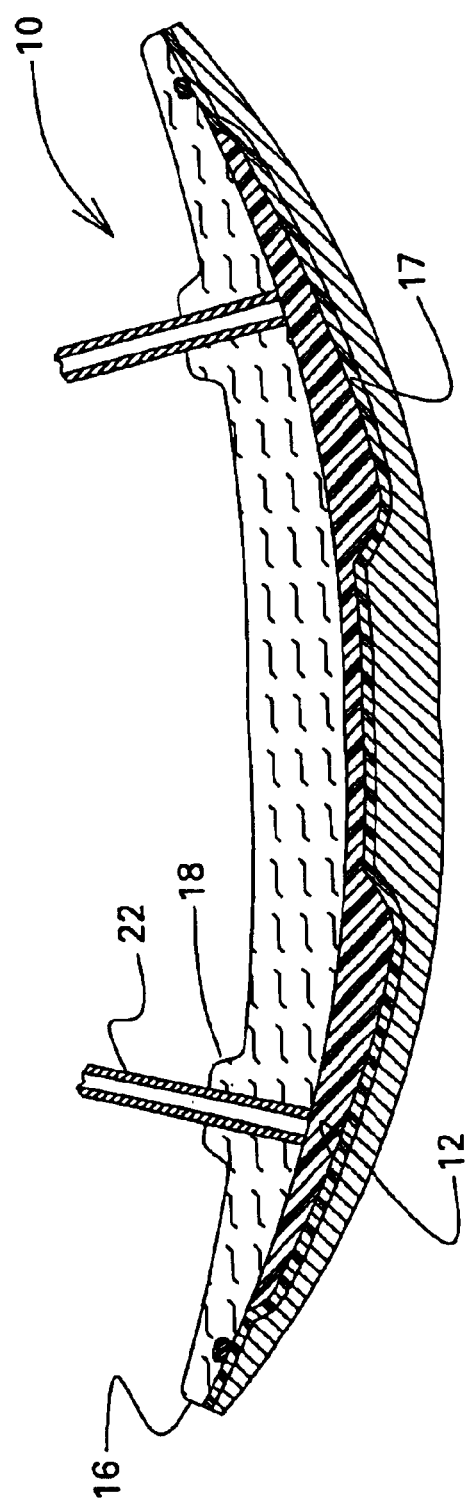
FIG. 3 is a schematic cross-sectional view of the injection system set forth in FIG. 2, taken along lines 3-3 of FIG. 2.

A caul sheet 16 is fitted, such as by clamping, to the contour of the concave side 14 of fan blade 10, as shown in FIGS. 2 and 3, and is sealed with an O-ring 19, which is retained in a groove around the periphery of caul sheet 16, as shown in FIG. 3. The caul sheet 16 is preferably made from a composite material, such as carbon fiber filaments embedded within an epoxy resin. Caul sheet 16 is provided with a plurality of injection ports 18, which are located on caul sheet 16 so as to correspond with the location pockets 12 on fan blade 10 when caul sheet 16 is fitted on blade 10. Although caul sheet 16 is shown with a plurality of injection ports 18, if there is communication among the pockets 12 in the blade 10, a single injection port 18 may be used.

Referring to FIG. 2, the pre-heated mold in each respective cavity 12 of fan blade 10 formed after composite caul 16 is clamped and sealed to the fan blade. The fan blade is preheated to a temperature in the range of 210–250° F. (99–121° C.). The third mixture is cast into the cavities or pockets by an injector manifold 20 that injects the third mixture through injection ports 18. After the pockets are filled with foam, the foam is held for a sufficient period of time to permit the foam to gel in the pockets, typically about 5 minutes, during which time, the pressure is maintained until the foam is cured. In general, the foam is typically cured by exposure to a preselected, elevated temperature for a preselected time; however, certain foam formulations that may be used in the practice of this invention do not require elevated temperature exposure, as they cure at ambient temperatures. The pockets must be filled with foam and cannot be left as a void space insofar as void space(s) would adversely affect the aerodynamic characteristics of the blade. As the foam cures, it forms a strong adhesive bond with the blade surfaces it is contacted by. However, it does not form a strong bond with the caul sheet, the caul sheet being selected or treated so as not to bond with the foam as it cures.

After the polymer has gelled, the fan blade is placed into an oven at a temperature of about 210–250° (99–121° C.) for a time sufficient to permit cross-linking to at least partially develop within the polymer to provide sufficient rigidity to allow demolding of the polyurethane, that is, the removal of the composite caul sheet and associated tooling from the back or concave side 14 of the blade 10 while leaving the foam within the pockets. This time is typically from 0.5 to 2 hours. The blade is then placed into an oven at a temperature about 212–270° F. (100–132° C.) for about 16–50 hours for curing. Because of the loads experienced in aircraft engine fan blades, which can cause undesirable creep of the elastomer, it is preferable to fully cross-link the foam during cure to develop improved creep resistance.

After curing, the caul sheet 16 is removed, and the cured foam in pocket 12 forms a portion of the concave side of the fan blade 10. This provides a fan blade that is much lighter than those blades made entirely of metal or CFRC, due to the use of the low density foam in the pockets which are molded onto the primary structure of the fan blade. Further, because metals and CFRC's are nonetheless being used to a large degree, the strength of the blade and its resistance to bird strikes and other ingested foreign material is not sacrificed.

Thus, in a further aspect of the invention, there is provided an article comprised of a thermoset polymeric composition having a modulus of elasticity of at least 250 psi (1.72 MPa), comprising the reaction product of (a) a curative system comprising at least one compound having at least two active hydrogen-containing groups per molecule; and (b) a prepolymer composition comprising the product of the melt blending of (i) hollow polymeric microspheres having an average diameter of less than 1000 μm, said microspheres comprised of a shell portion and a hollow core portion said shell portion comprised of at least one thermoplastic resin; and (ii) at least one polyether, having a molecular weight of about 250 to 60,000 Daltons, and an isocyanate functionality content of about 3.0 to 7.0%.

In an especially preferred embodiment, the article of the present invention is a turbine fan blade or guide vane. Thus, in this embodiment, there is provided a turbine fan blade or guide vane comprising (I) a metal or composite blade having at least one pocket that forms a portion of a mold; and (II) a thermoset polymeric composition having a modulus of elasticity of at least about 250 psi (1.72 MPa), comprising the reaction product of (a) a curative system comprising at least one compound having at least two active hydrogen-containing groups per molecule; and (b) a prepolymer composition comprising the product of the melt blending of (i) hollow polymeric microspheres having an average diameter of from about 40–120 μm, said microspheres comprised of a shell portion and a hollow core portion, said shell portion comprised of at least one thermoplastic resin; and (ii) at least one polyether elastomer, having a molecular weight of about 250 Daltons to 30,000 Daltons, and an isocyanate functionality content of about 3.0 to 7.0%; said thermoset polymeric composition being bonded to the blade surfaces to form a blade-polymeric composition composite.

The preferred modulus of elasticity is dependent on whether the foam is used in a dynamic structure (e.g. fan blade) or a static structure (e.g. guide vane). In dynamic applications where the foam material is subjected to centripetal loading, the modulus must be high enough to prevent the material from deforming under load. Such deformation would have a negative impact on the aerodynamic efficiency of the engine. Modulus requirements are broader for static applications, because the material does not experience centripetal loads. Guide vanes will also not experience as high a strain as fan blades under bird impact conditions, because impact velocities will be lower. Therefore, it does not need to be as resilient (i.e. it can have higher modulus). Another factor which influences the selection of modulus is the density (or specific gravity, i.e. density of material divided by density of water where the specific gravity of water is 1.0) of the polymer. Lower specific gravity material (such as foam) will experience lower centripetal load, and therefore will not deform as much under load and can therefore have lower modulus. The modulus of elasticity requirement can therefore be expressed as specific modulus of elasticity. The specific modulus of elasticity is defined as the modulus of elasticity divided by the density. Therefore, the preferred specific modulus of elasticity for guide vanes ranges from about 250 to 250,000 psi (1.72 to 1720 MPa) with the most preferred range being from about 1000 to 100,000 psi (6.89 to 6890 MPa). For fan blades, the preferred specific modulus of elasticity ranges from about 1000 to 100,000 psi (6.89 to 6890 MPa) with the most preferred range from about 5000 to 50,000 psi (34.5 to 345 MPa).

One advantage of the present invention is that the elastomeric polyurethane composition can be cured directly to the blade. Because the pockets form part of the mold, the foam mates with essentially 100% of the available interface surface area of the blade. Because of the excellent adhesive characteristics of the polyurethane to the metal, the maximization of the surface area contact between the polyurethane and the metal provides for a strongly bonded insert.

Alternatively, a chemical bonding agent can be utilized to enhance the adhesion of the polyurethane to the metal, or the pockets of the blade may be roughened so that the surface area on the metal or composite blade is increased, thereby increasing the mechanical strength of the bond between the metal or composite blade and the thermoset composition.

In this regard, one type of chemical bonding agent that can be utilized is THIXON®, a vulcanizable film formed by elevated temperature crosslinking, and commercially available from Morton International. Another and preferred type of chemical bonding agent is a chemical mixture of solvents that act as a carrier for at least one filler and dissolved phenolic resins derived from substituted phenols, including but not limited to phenol, o-cresol, p-cresol, 2,6-xylenol, 2,4-xylenol, alkyl phenol, and t-butylphenol. Other equivalent variations of these chemical species may be substituted or additionally included in the mixture. The carriers and solvents will evaporate, leaving the filler and phenolic resins that will provide an adhesive bond with the blade and the elastomeric composition. Preferred solvents include at least one solvent selected from the group consisting of ethanol, methanol, methylethylketone, and methylisobutylketone, and combinations thereof. A preferred adhesive formed by the chemical upon evaporation of the solvent are phenolics, and a preferred filler is carbon black. Readily available bonding agents include the CHEMLOK® series or as TY-PLY BN® available from Lord Corporation of Erie, Pa. The bonding agents are applied to the surface of the blade, allowed to air dry for a period of at least about 30 minutes, and the elastomeric composition/microsphere blend cast thereon as set forth herein.

Another advantage of the present invention is that since the foam insert is cured in place, there is no misfit between the pocket and the blade so that the blade having the cured insert is aerodynamic, with little or not trimming required to remove excess material. This permits unimpeded flow of air entering the compressor while allowing the blade to operate at temperatures of up to 310° F. (155° C.).

Another advantage of the present invention is that the blade having the cured elastomeric insert(s) is significantly lighter than a corresponding blade comprised solely of metallic alloy, yet provides aerodynamic stability of such a blade. This weight advantage provides a corresponding improvement in fuel efficiency of the engine without adverse effects on performance.

Still another advantage of the present invention is the cost saving associated with replacing expensive metallic alloys such as titanium alloys and continuous fiber reinforced composites with inexpensive polyurethane elastomer.

Finally, the present invention provides an advantage over a system in which elastomer is cured and then assembled into the pockets with an adhesive, since the time consuming and labor intensive step of adhesive bonding is eliminated and the potential for unbonded interfaces between the elastomer and the blade pocket is greatly reduced. The present invention is thus self-adhesive and problems associated with fit-up are eliminated.

EXAMPLES

The following examples are set forth to provide those of ordinary skill in the art with a detailed description of how the methods claimed herein are evaluated, and are not intended to limit the scope of what the inventors regard as their invention.

A "sheet" mold was used to produce sheets of filled polyurethane compositions which were evaluated for suitability for use in fabricated articles according to the instant invention. Alternatively adhesion specimens could be produced by casting the filled polyurethane compositions onto titanium parts prepared for such purpose. The sheet mold was equipped with a port for bottom filling, and an open top. The mold for producing adhesion specimens was designed to hold the titanium adhesion specimen parts securely during casting, ensuring the proper flow of material into the bond area of the specimens. Prior to assembly, the mold parts were treated with mold release to aid disassembly and demolding following the casting of parts.

Example 1

ADIPRENE® LF950A (7,660 grams) polyurethane prepolymer (Uniroyal) (5.93% NCO content) was weighed into a large metal pail, and placed in an oven preheated to 150° F. Powdered LONZACURE® MCDEA (1,000 grams) was weighed into a separate 1 gallon metal can. To the dry LONZACURE® MCDEA was added IRGANOX® 5057 (0.094 grams), TINUVIN® 571 (0.94 grams), and TINUVIN® 765 (0.188 grams). The 1 gallon can containing the LONZACURE-IRGANOX-TINUVIN mixture was then placed in an oven preheated to 225° F. When the LONZACURE-IRGANOX-TINUVIN mixture was completely melted, it was stirred with a metal paint stirrer to ensure uniformity and then filtered through a strainer into the "curative tank" of a standard, multi-tank polyurethane processing apparatus. The curative tank and associated transfer lines were preheated to 225° F. An atmosphere of dry nitrogen at 35 psi was maintained in the curative tank.

The ADIPRENE® LF950A® prepolymer, now heated to 150° F., was removed from the oven and while the prepolymer was still hot, 249 grams of EXPANCEL® 091DE microspheres were slowly added, using a mixing element attached to a variable speed power drill to disperse the microspheres in the prepolymer. When the microspheres appeared to have been uniformly distributed in the prepolymer, the mixture was pumped into the "prepolymer tank" of the polyurethane processing apparatus. The prepolymer tank and associated transfer lines had been preheated to 150° F. The prepolymer tank was equipped to provide continuous mixing and degassing of the prepolymer-microsphere mixture.

A "sheet" mold was used to produce a solid sheet of filled polyurethane product. The sheet mold assembly was placed in a preheated oven at 225° F. for 2.5 hours prior to casting the sheet. Prior to casting the material into the sheet mold, the flow rates of material from the prepolymer tank and curative tank were measured and adjusted as necessary to ensure that the stoichiometry of curative to prepolymer was within the desired range. In this example, the stoichiometry was adjusted to 99.3%, meaning that there was a slight (0.7 percent) stoichiomeric excess of isocyanate groups relative to amine groups in the formulation employed. The transfer lines from the prepolymer and curative tanks were then attached to the mix-head of the processing apparatus, and the material was dispensed through a hose attached to the mix-head, and cast into the previously prepared molds, described above. The filled mold was immediately transferred to an oven preheated to 225° F. for a period of about 35 minutes. The mold was then taken from the oven, and resultant sheet removed from the mold. The demolded sheet was then transferred immediately to another oven and heated at 266° F. for 48 hours to complete the curing process. The sheet was then removed from the mold and allowed to cool to room temperature.

Comparative Examples 2 and 4 were carried out essentially as described for Example 1 to produce sheets for testing. In Comparative Example 2 hollow glass microspheres, Q-CEL® 6028 Hollow Spheres available from PQ Corporation, were employed instead of the EXPANCEL® 091DE microspheres (organic microspheres). In Comparative Example 4 the sheet contained no filler and was comprised essentially of polyurethane available prepared from PET-91A a polyurethane prepolymer available from AIR PRODUCTS corporation and LONZACURE® MCDEA curative. The materials used in Comparative Examples 1 and 3 were ROHACELL 300WF and low density BAYFIT soft polyurethane foam respectively, each of which was purchased in sheet form. ROHACELL 300WF is available commercially from RICHMOND AIRCRAFT Corporation. The BAYFIT soft polyurethane foam is available from BAYER Corporation.

Tensile Tests

Tensile tests were run according to ASTM D 638. The specimens were prepared by punching out the dogbone shapes (Type II, ASTM D 638) from cured sheets for all samples except the ROHACELL foam. The ROHACELL foam was machined from a sheet into the test samples having a dogbone shape. Tests were run on a load frame using a high extension extensometer at 10 inches per minute. Data are given in Table 1 which illustrate the outstanding combination of modulus and elongation exhibited by the polyurethane composition incorporating the organic microspheres (Example 1) relative to other foams (Comparative Examples 1 and 3) or a foam which was identical to that used in Example 1 but which comprised hollow glass microspheres (Comparative Example 2) instead of the organic microspheres. In order for a foam to be of maximum utility in turbine and other applications described in the present invention it is believed that the modulus of the cured composition be greater than about 8 ksi, preferably greater than about 8 ksi ( to minimize deformation) and that the percent elongation be greater than about 75 percent, preferably greater than about 200 percent (to assure adequate material ductility). Of the materials studied only the polyurethane foam comprising the organic microspheres outperformed this standard. In Table 1 the term "Comparative Example" is abbreviated "CE". The abbreviation "ksi" stands for kilograms per square inch.

TABLE 1

TENSILE PROPERTIES

| Example | Foam Composition | Modulus | Elongation |
|---|---|---|---|
| Example-1 | LF950/LONZACURE/091DE | 12 ksi | >200% |
| CE-1 | ROHACELL 300WF | 75 ksi | 4% |
| CE-2 | LF950/LONZACURE/hollow glass | 53 ksi | 6% |
| CE-3 | BAYER SF FOAM | 0.2 ksi | 80% |

Drop Weight Impact Tests

Each of the materials of Example 1 and Comparative Examples 1, 3 and 4 was evaluated in a drop weight impact test according to ASTM Method D 5628-94 using a 8 pound weight dropped from a height of 28 inches using a rounded "tup" having a diameter of 0.5 inches. Test samples were prepared as follows. The cured sheets of Example 1 and Comparative Example 4, and sheets of the commercially available foams of Comparative Examples 1 and 3, were cut and bonded with five minute epoxy to a titanium sheet (Ti-6Al-4V) having a thickness of 0.063 inches. Following the drop weight impact test each of the test samples was inspected visually and the result recorded. Test data are presented in Table 2 and illustrate the surprising finding that the material comprising the organic microspheres provides an excellent combination of low density (0.7 grams per cubic centimeter (g/cc)) and high strength. In Table 2 the heading "d(g/cc)" refers to the density of the cured foam. Under the heading "Impact Result", data are given which describe the diameter of the mark left by the falling tup on the foam layer and the depth of penetration of the falling tup into the foam layer. In Example 1 the falling tup left a mark in the foam having a diameter of about 0.5 inches and penetrated the foam to a depth of about 0.015 inches. In Comparative Example 3 the foam used failed to shield the underlying titanium backing from the falling tup and the titanium backing itself was dented. In Comparative Example 4, the polyurethane itself proved highly resistant to the falling tup but was of much higher density than the filed polyurethane of Example 1. Particularly in aeronautic applications, lightweight materials which provide adequate impact resistance are prized. The filled polyurethane composition of Example 1 comprising organic microspheres shows just such a desirable combination of high impact resistance and low density sought for a variety of applications.

TABLE 2

IMPACT RESISTANCE

| Example | d(g/cc) | Composition | Impact Result |
|---|---|---|---|
| Example-1 | 0.7 | LF950/LONZACURE/091DE | 0.5" diam/0.015" deep |
| CE-1 | 0.3 | ROHACELL 300WF | 0.5" diam/0.246" deep |
| CE-3 | 0.37 | BAYER SF FOAM | torn foam/Ti backing dented |
| CE-4 | 1.2 | PET-91A/LONZACURE | 0.4" diam./0.005" deep |

The invention has been described in detail with particular reference to preferred embodiments thereof, but it will be understood by those skilled in the art that variations and modifications can be effected within the spirit and scope of the invention.

We claim:

1. A turbine blade comprising:

(I) a metal or composite blade having at least one pocket adapted for forming a portion of a mold; and (II) a thermoset polymeric composition having a modulus of elasticity of at least about 250 psi (1.72 MPa), comprising the reaction product of (a) a curative system comprising at least one compound having at least two active hydrogen-containing groups per molecule; and (b) a prepolymer composition comprising the product of the melt blending of (i) hollow polymeric microspheres having an average diameter of from about 40–120 $\mu$m, said microspheres comprised of a shell portion and a hollow core portion, said shell portion comprised of at least one thermoplastic resin; and (ii) at least one polyether elastomer, having a molecular weight of about 250 Daltons to 30,000 Daltons, and an isocyanate functionality content of about 3.0 to 7.0%;

said thermoset polymeric composition being bonded to the blade surfaces to form a blade-polymeric composition composite.

2. The blade of claim 1, wherein the active hydrogen-containing compound is selected from polyamine compounds, polyhydroxy compounds, and compounds having both hydroxy and amino functionality.

3. The blade of claim 1, wherein the compound having at least two active hydrogen groups per molecule is selected from the group consisting of methylene-bis-o-chloroaniline; 4,4'-methylenebis(3-chloro-2,6-diethylaniline); isophoronediamine; diethylene diamine; 1,2 bis(2-aminophenylthioethane); diethyltoluene diamine; dimethylthiotoluenediamine; 1,3-trimethylene glycol bis(p-aminobenzoate); methylene bis N,N dibutylaniline; 1,3-butanediol; 1,4-butanediol; 2,2-dimethyl-1,3-propanediol; poly(tetramethylene ether glycol), having molecular weights of about 178 to 50,000 Daltons; 1,1'isopropylidine-bis-(p-phenylene-oxy)-di-2 ethanol; 1,4-cyclohexanedimethanol; glycerine; 1,6-hexanediol; hydroquinone di($\beta$-hydroxyethyl ether); 2-methyl-1,3-propanediol; N,N,N',N'-tetrakis(2-hydroxyethyl)ethyl diamine; d-glucitol; and trimethylolpropane.

4. The blade of claim 1, wherein the hollow microsphere is comprised of at least 50 mole % of monomeric units derived from acrylonitrile.

5. The blade of claim 1, wherein the hollow microsphere is further comprised of monomeric units derived from methacrylic acid esters or vinylidene chloride.

6. The blade of claim 1, further comprising at least one hindered amine light stabilizer.

7. The blade of claim 1, further comprising at least one UV light absorber.

8. The blade of claim 1, wherein the polymeric microspheres are utilized in an amount of about 0.1 parts by weight to about 50 parts by weight, based upon 100 parts of polymer resin.

9. The blade of claim 1, wherein the active hydrogen-containing compound is 4,4'-methylenebis(3-chloro-2,6-diethylaniline), and wherein the amount of hollow microspheres utilized is about 0.5 parts by weight to about 6 parts by weight, based on 100 parts of the thermoset composition.

* * * * *